June 28, 1960 L. KRAUS 2,942,871
TORSION ROD
Filed July 5, 1955

INVENTOR
LUDWIG KRAUS
BY Dicke and Craig
ATTORNEYS

United States Patent Office 2,942,871
Patented June 28, 1960

2,942,871
TORSION ROD

Ludwig Kraus, Stuttgart-Rotenberg, Germany, assignor to Daimler-Benz Aktiengesellschaft, Stuttgart-Unterturkheim, Germany Filed July 5, 1955, Ser. No. 519,815

Claims priority, application Germany July 2, 1954

5 Claims. (Cl. 267—57)

The present invention relates to new improvements in torsion rods, and more particularly to a torsion rod which is mounted within the joint or flexible coupling of an oscillating supporting member, especially for mounting the independently suspended wheels of a motor vehicle on the frame thereof.

It is the principal object of the present invention to provide a torsion rod the length of which is considerably reduced as compared with the length of such rods as usually required for such purpose without, however, thereby decreasing the extent of the resilient stroke of such torsion rod.

An essential feature of the invention consists in dividing the torsion rod into an inner member and at least one tubular outer member which is disposed around and concentrically with such inner member with one end of each of the two or more torsion rods being connected to the respective guide member or a part of the frame of the vehicle while the other ends of the individual torsion rods are connected to each other in the direction of the torsional movement thereof.

Another feature of the invention consists in extending the interconnected ends of the torsion rods at one side beyond the joint or coupling, while the opposite end of the inner torsion rod may be likewise extended but in the opposite direction, and may be connected with the frame part or similar element at a point beyond the outer torsion spring or beyond the bearing of the respective parts which are to be resiliently suspended relative to each other.

Still another object and feature of the present invention resides in providing suitable means for adjusting the torsion spring at the end thereof facing the frame of the vehicle.

Further objects, features, and advantages of the present invention will be apparent from the following detailed description thereof, as well as from the accompanying drawings illustrating two embodiments of the invention in which.

Figure 3:
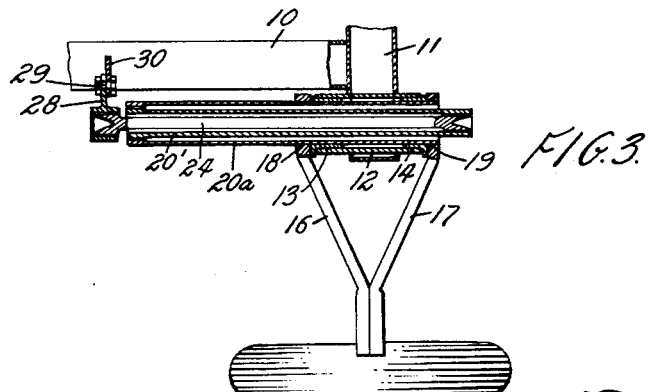
Figure 3 is a plan view partially in section illustrating another embodiment of the invention utilizing more than two coaxially arranged torsion rods.

Referring to the drawing, the longitudinal tubular or channel member 10 of a chassis frame is welded together with a cross member 11, the projecting end portion of which carries a tube or sleeve 12 which extends transversally through cross member 11 and is likewise welded thereto. Axially spaced bushings 13 and 14 are fitted into the opposite ends of sleeve 12 and within these bushings a bearing tube 15 is rotatably mounted which, in turn, has rigidly mounted thereon the arms 16 and 17 of a supporting member, for example, of a wheel of the vehicle, by means of serrated joints 18 and 19 so that, when the wheel oscillates upwardly or downwardly, tube 15 pivots together with the wheel within the bushings 13 and 14. The bearing structure thus defined permits the arms 16 and 17 and the associated bearing tube 15 to rotate about the axis of the latter in the sleeve 12 but other movement of the arms 16 and 17 is opposed. Moreover, the bearing structure provides support of the bearing tube 15 at points spaced axially thereof so that further support from the body for the torsion rod 20 extending from the tube 15 is unnecessary.

Tube 15 is provided with a tubular extension 20 which because of its thin wall strength and the quality of its material is capable of acting as a torsion rod. The reinforced outer end 21 of this outer torsion rod 20 is connected by means of serrations 22 to the reinforced end 23 of an inner torsion rod 24 which extends coaxially through the outer torsion rod 20 and the bearing tube 15 thereon, and another reinforced end 25 thereof is connected by means of serrations 26 to a hub member 27 which has an arm 28 which is connected by one or more bolts 29 to a plate 30 which, in turn, is mounted on the longitudinal frame member 10. Thus, the torsional forces acting on the torsion rod 24 will be transmitted through arm 28 to the longitudinal frame member 10. Plate 30 is provided with a series of bores 31 arranged within an arc of a circle about the axis of the torsion rods 20 and 24. Thus, by inserting the bolt or bolts 29 into one or the other bores in the plate 30 it is possible to adjust the initial tension of the torsion rods 24 and 20.

Figure 1:
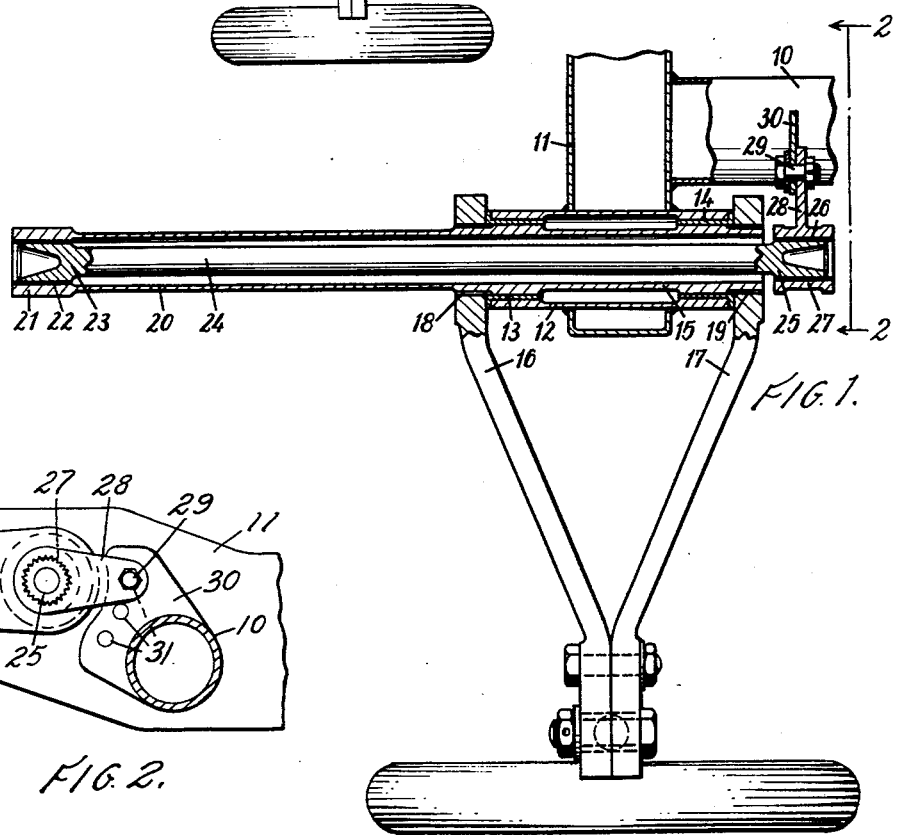
Figure 1 is a plan view partially in section of the wheel suspension for one wheel of a vehicle.
Figure 2:
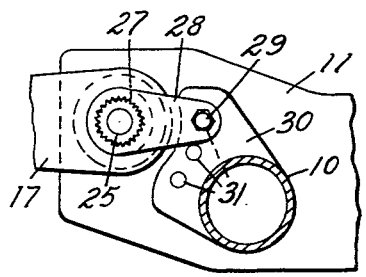
Figure 2 is a view on line 2—2 of Figure 1 illustrating an adjustment mechanism for the torsion rod assembly.

Obviously, the torsion rod structure according to the invention is not restricted to the particular application as described for resiliently suspending the wheels of a motor vehicle on the frame thereof, but it may be used for any other purpose where a torsion rod of considerable strength but capable of resiliently turning around a large angle is to be confined within a relatively small space. Also, as previously indicated, if it is desired that the length of the torsion rod structure be further reduced or the extent of the resilient angular turning movement thereof be increased, the spring, instead of being composed of two torsion rods extending within each other, may be formed of three or more rods as illustrated in Figure 3. In such event, two or more tubular rods 20' and 20a would extend within each other and be connected at one end, the other end of the innermost tubular rod 20' would be connected to the central rod, while the free ends of the central rod and the outermost tubular rod 20a would be connected to the respective elements upon which such spring is intended to act. A torsion adjusting arrangement similar to that shown in Figure 1 interconnects the inner torsion rod 24 with the frame member 10.

Although my invention has been illustrated and described with reference to the preferred embodiments thereof, I wish to have it understood that it is in no way limited to the details of such embodiments or to the specific examples described, but is capable of numerous modifications within the scope of the appended claims.

Having thus fully disclosed my invention, what I claim is:

1. In combination with a motor vehicle having a frame, at least one pair of wheels, and means for independently suspending each wheel on said frame, said means comprising an inner torsion rod, at least one tubular torsion rod around said inner rod and coaxial therewith, a bearing structure mounted on said frame for rotatably supporting and guiding one end of the outer tubular rod, a connecting member connected to one of said wheels and secured to said outer rod at said one end thereof, said bearing structure having bearing surface means adjacent only to said one end of said outer rod and engaging and rotatably supporting said one end at points spaced axially thereof to such an extent as to confine said outer rod substntially only to rotational and torsional movement about its longitudinal axis when said one wheel is displaced relative to said frame so that further support of the other end of said outer rod from said body is unnecessary, said bearing member being so constructed and arranged as to permit rotational movement of said connecting member and said one end of the outer rod about the axis of the latter, but preventing other relative movement of said connecting member and said one outer rod end with respect to said bearing member, the corresponding end of said inner rod extending slightly beyond said outer rod and one end of said bearing structure and including means adjacent said bearing structure securing it against rotation to said frame, the other ends of said inner and outer rods freely extending considerably beyond the other end of said bearing structure and being exclusively interconnected with each other without other means of support, said inner and outer rods being substantially coextensive with each other and forming portions of a single torsion spring.

2. In a combination as defined in claim 1, further comprising means connected to said inner rod and said frame for adjusting the initial tension of said entire torsion spring.

3. A torsion spring system for resiliently suspending a first member on a second member, and more particularly for independently suspending the wheels on the frame of a vehicle, comprising an inner torsion rod and at least one tubular torsion rod around said inner rod and coaxial therewith, one end of said inner torsion rod being connected to said second member which comprises part of said frame, and one end of the outer tubular torsion rod being connected to the first member which comprises a swing arm structure for independently suspending a wheel relative to said frame, the other ends of said rods being interconnected with each other so that said rods are substantially coextensive with each other and together form a single torsion spring, said second member having bearing means thereon for rotatably supporting and guiding one portion of said outer torsion rod, said first member being connected to said outer torsion rod at axially spaced points adjacent opposite ends of said bearing means, said bearing means permitting rotational movement of said arm structure about an axis, but preventing other movement of said arm structure relative to said bearing means, said other ends of said torsion rods being without direct support from said one member.

4. A torsion spring system as defined in claim 3, wherein the connection of one end of said inner torsion rod with said second member comprises means for adjusting the tension of said torsion spring.

5. A torsion spring system for resiliently and independently suspending a wheel supporting arm structure relative to a main vehicle body member, comprising an inner torsion rod and at least one tubular torsion rod around said inner rod and coaxial therewith, first means for connecting a first end of said inner torsion rod to said member, and second means for rotatably supporting the outer tubular torsion rod on said vehicle body member, said second connecting means comprising bearing means on said vehicle body member adjacent to said outer rod only at said first end and engaging and rotatably supporting said first end of the outer torsion rod at points spaced axially thereof to such an extent as to confine said outer rod substantially solely to rotational and torsional movement about its longitudinal axis when said arm structure is displaced relative to said body member so that further direct support of the second end of said outer rod from said body member is unnecessary, and means for rigidly connecting said first end of the outer tubular torsion rod to said arm structure, the other ends of said rods being connected so that said rods are substantially coextensive with each other and are supported relative to said member and said arm structure exclusively by said first ends and so that each of said rods torsionally resists pivotal movement of said arm structure relative said member.

References Cited in the file of this patent

UNITED STATES PATENTS

| | | |
|---|---|---|
| 2,103,590 | Lefevre | Dec. 28, 1937 |
| 2,395,183 | Holmstrom et al. | Feb. 19, 1946 |
| 2,480,934 | Julien | Sept. 6, 1949 |
| 2,607,610 | Allison | Aug. 19, 1952 |
| 2,782,881 | Roller | Feb. 26, 1957 |

FOREIGN PATENTS

| | | |
|---|---|---|
| 622,994 | Germany | Dec. 11, 1935 |